(No Model.)
S. L. BARRIETT.
SWITCH FOR ELECTRIC APPARATUS.
No. 423,891. Patented Mar. 18, 1890.
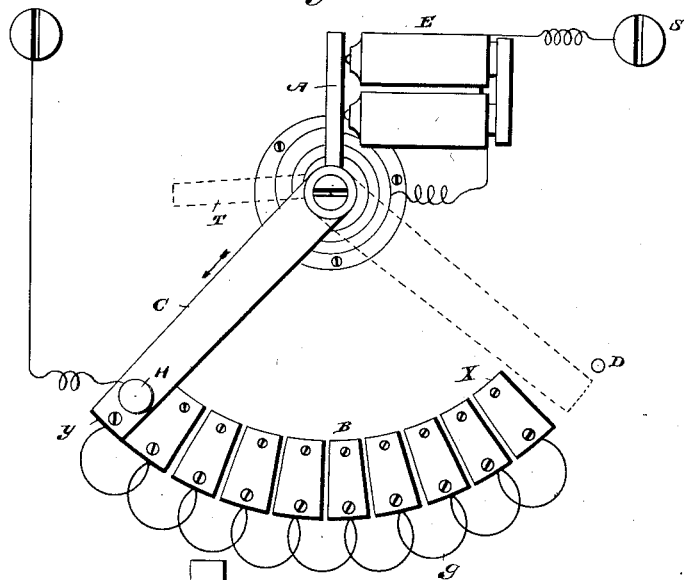
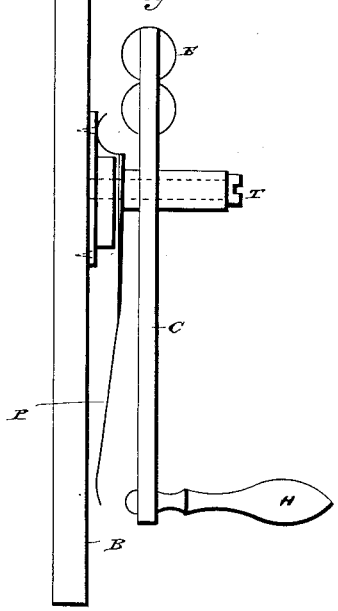
Witnesses
Inventor
Saml. L. Barriett.
By his Attorney
W. R. Stringfellow

UNITED STATES PATENT OFFICE.

SAMUEL L. BARRIETT, OF NEW ORLEANS, LOUISIANA, ASSIGNOR TO THE SOUTHERN ELECTRICAL MANUFACTURING AND SUPPLY COMPANY, (LIMITED,) OF SAME PLACE.

SWITCH FOR ELECTRIC APPARATUS.

SPECIFICATION forming part of Letters Patent No. 423,891, dated March 18, 1890.

Application filed March 2, 1889. Serial No. 301,791. (No model.)

*To all whom it may concern:*

Be it known that I, SAMUEL LAWRENCE BARRIETT, a citizen of the United States, residing at New Orleans, in the parish of Orleans and State of Louisiana, have invented certain new and useful Improvements in an Automatic Switch for Electrical Apparatus; and I do declare the following to be a full, clear, and exact description of the invention, such as will enable others skilled in the art to which it appertains to make and use the same.

My invention relates to an improvement in automatic devices used in connection with motors, (or other electrical apparatus or machines;) and my object is to provide a device or an arrangement by which, after the electrical circuit is broken, any particular part—lever, arm, or switch (or other arrangement used for regulating the current for such motor, apparatus, or machines)—is made to return to a given or fixed place or position. It is particularly useful when applied to electrical rheostats, the object in that case being to provide an arrangement whereby, as soon as the electric current is broken or cut out, the crank-handle or other device on the rheostat regulating the flow of electricity automatically returns at once to a given or fixed position or situation.

I shall first explain and describe the invention as applied to a rheostat of ordinary construction. When an electric circuit is closed, so as to turn the current upon a given object or machine, it is often proper or necessary at the beginning to have the force of the current so reduced that its full strength does not bear upon the object or machine. Accordingly, although the full current is turned on by an independent switch, the rheostat is so arranged that the current may be made weaker or stronger at will, this regulation at present being usually effected by a crank, handle, or other device, which enables the operator to regulate the strength of the current of electricity between the extreme points—that is, between zero and the point of a highest efficiency—the increase or decrease being accomplished by removing resistance from the circuit or interposing resistance to the circuit. As a rule, when a motor is to be started, the circuit is closed by an independent switch, the crank or handle of the rheostat being placed in such a position as to allow little or none of the force of the current to take effect upon the motor. After the circuit is closed by an independent switch the crank or handle is moved so as to make contact with the first segment of the rheostat, and when this is done the motor starts. As soon as it gets under way the crank or handle of the rheostat is turned or moved so as to gradually decrease the resistance, and so increase the flow of the current through the motor until finally the resistance is all removed and the whole force of the current operates upon the motor. When it is desired to stop the motor, the current of electricity is broken or cut off, usually by an independent switch, and after this has been done the crank or handle of the rheostat is, or should always be, returned to its original position—that is, the position it should hold when motor is not at work—which position, as stated above, is such as to allow none or at most very little of the current to reach the motor. Unless the crank or handle be returned to this position—that is, after the current is cut off, unless the rheostat is so arranged as to allow none or at most very little of the current to pass through the motor—there is great danger when the motor is to be used again in turning on the full current. Should the current be turned on while the rheostat is so arranged as to allow its full force to reach the motor, there is danger of serious damage to the motor, and even of its destruction.

My invention when applied to a rheostat regulating the current supplied to a motor, provides an improved device which, whenever the electric current is broken, automatically causes the crank or handle of the rheostat (or other device regulating the flow of the electric current) to return to the position and arrangement which should obtain when the motor is not in use, so that the subsequent turning on of the electric current by an outside or independent switch or other device does not throw the full force upon the motor, and all danger of harm or damage is obviated.

My apparatus consists of a combination of various devices, and one form of the invention is shown in the accompanying drawings, in which—

Figure 1 is a front view, and Fig. 2 is a side view.

Similar letters refer to similar parts throughout the several views.

The drawings show a rheostat of ordinary construction and certain devices in combination therewith.

S and S' are binding-posts; E, electro-magnets; A, an armature attached to and forming part of C, an arm which is turned or revolved about the screw T by the handle H, the screw T holding the arm C firmly down upon the contact-spring P and causing the same to rest upon the segments B of the rheostat, X and Y being the extreme segments; $g$, the resistance-coils; and D a stop-pin, which stops the arm C at that point, preventing the spiral spring R from uncoiling further.

The operation of the machine is as follows: When the machine is at rest, the arm C is held against the pin D by the spiral spring R, the arm C and the armature A then being in the positions shown by the dotted lines and the electric circuit being open. Now, after the circuit has been closed, (usually by an independent switch, not shown,) the arm C is moved so that the contact-spring P is brought into contact with the first segment X of the rheostat. This closes the circuit through the binding-post S, electro-magnets E, contact-spring P, segment X, resistance-coils $g$, and binding-post S'. The moment the circuit is closed the electro-magnets E become magnetized. The closing of the circuit also starts the motor. Then the handle H, turning the arm C, is gradually moved around until the contact-spring P is brought into contact with segment Y, cutting out the resistance-coils and throwing the whole force of the current upon the motor. The armature A, now being in close proximity to the electro-magnets E, is held by them in that position so long as the circuit is closed. The moment, however, the circuit is open or broken the electro-magnets E lose their power, becoming demagnetized, and release the armature A, thus permitting the spiral spring R to move or turn the arm C (and with it the contact-spring P) to its normal position. (Shown by the dotted lines.)

In the drawings the stop-pin D is so placed that when the arm C rests against it the circuit is open. If for any reason it be desired to stop the arm at a point where the contact-spring P rests upon one of the segments of the rheostat, then the stop-pin D is placed accordingly, and in this way the arm C can be made to return automatically to any desired position, such position being fixed by the place of the stop-pin D.

In practice it will be found best to place the stop-pin in such a position that when the arm C rests against it the circuit is open.

The foregoing description shows the invention as applied to an ordinary rheostat regulating the current for a motor; but it is evident that the apparatus is applicable to any arrangement or device used in connection with motors (or other electrical apparatus or machines) where it is desired, after breaking or cutting out the current, to return any particular part—lever, arm, or switch, (or other arrangement used for regulating the current for such motor, apparatus, or machines)—to a given or fixed place or position. The application of the invention to such different arrangements or devices of this kind as now exist or hereafter may exist is simply a matter of mechanical skill.

Having fully described my invention, what I claim, and desire to secure by Letters Patent, is—

In a switch for electric apparatus, the combination, with the segments arranged in the arc of a circle and the resistance-coils connecting the same, of the screw T, the arm C, journaled on said screw and held down on the contact-spring thereby, the armature secured to the inner end of the arm and at an angle thereto, and the contact-spring P, arranged beneath said arm and having its outer end adapted to bear upon the segments, substantially as specified.

In testimony whereof I affix my signature in presence of two witnesses.

SAMUEL L. BARRIETT.

Witnesses:
 HELMUTH HOLTZ,
 PERCY D. PARKS.